(12) United States Patent
Mooney

(10) Patent No.: US 6,577,723 B1
(45) Date of Patent: Jun. 10, 2003

(54) APPLICATION OF TCAP CRITERIA IN SCCP ROUTING

(75) Inventor: Christopher Mooney, Livingston, NJ (US)

(73) Assignee: AT&T Wireless Service, Inc., Redmond, WA (US)

( * ) Notice: Subject to any disclaimer, the term of this patent is extended or adjusted under 35 U.S.C. 154(b) by 561 days.

(21) Appl. No.: 09/615,485

(22) Filed: Jul. 13, 2000

(51) Int. Cl.[7] .................. H04J 3/12; H04L 12/66; H04M 7/00; H04Q 7/20
(52) U.S. Cl. .................. 379/221.08; 370/352; 370/410; 370/467; 370/469; 370/522; 379/230; 455/433; 455/552
(58) Field of Search .................. 370/352, 353, 370/354, 355, 356, 401, 410, 466, 467, 469, 522; 379/219, 220.01, 221.08, 230; 455/432, 433, 552

(56) References Cited

U.S. PATENT DOCUMENTS

| | | | |
|---|---|---|---|
| 5,838,782 A | 11/1998 | Lindquist | 379/230 |
| 5,852,660 A | 12/1998 | Lindquist et al. | 379/230 |
| 5,867,788 A | 2/1999 | Joensuu | 455/445 |
| 5,878,347 A | 3/1999 | Joensuu et al. | 455/433 |
| 5,905,952 A | 5/1999 | Joensuu et al. | 455/433 |
| 5,940,492 A | 8/1999 | Galloway et al. | 379/230 |
| 6,044,142 A * | 3/2000 | Hammarstrom et al. | 379/223 |
| 6,094,479 A * | 7/2000 | Lindeberg et al. | 379/220.01 |
| 6,324,183 B1 * | 11/2001 | Miller et al. | 370/467 |
| 6,434,127 B1 * | 8/2002 | Ha | 370/328 |
| 6,515,997 B1 * | 2/2003 | Feltner et al. | 370/401 |

* cited by examiner

*Primary Examiner*—Harry S. Hong
(74) *Attorney, Agent, or Firm*—Gray Cary Ware & Freidenrich; Terrance A. Meador (57) ABSTRACT

A method for routing messages in a telecommunications network is disclosed. The method includes receiving a Signaling Connection Control Part (SCCP) message and determining the type of upper layer protocol employed in the SCCP message. The method also includes routing the SCCP message in response to the determined type of upper layer protocol.

21 Claims, 5 Drawing Sheets

APPLICATION OF TCAP CRITERIA IN SCCP ROUTING

BACKGROUND

1. Field of the Invention

The invention relates generally to processing of messages in a telecommunications network. In particular, the invention relates to processing a message in response to the type of upper layer protocol used in the message.

2. Background of the Invention

Packet data services are currently being developed for incorporation into existing cellular networks. For instance, Cellular Digital Packet Data (CDPD) and General Packet Radio Service (GPRS) are data services being integrated into existing cellular networks. CDPD is being integrated into Advanced Mobile Phone Service (AMPS) and TIA/EIA 136 and GPRS are being integrated into TIA/EIA 136. Once a packet data service is integrated into an existing cellular network, mobile stations are often able to receive service from both the packet data network and the existing cellular network. Although these mobile stations can receive multiple services, they often have a single Mobile Directory Number (MDN).

Existing cellular networks employ a Home Location Register (HLR) which tracks the location of mobile stations as they roam from one coverage area to another. When the network receives a message destined for a mobile station, the network sends that mobile station's HLR a request in order to discern the current location of the mobile station. The information provided by the HLR is used to route the incoming message to a mobile station.

When an existing cellular network integrates a packet data service, a second HLR is often required for servicing the packet data messages. The existence of multiple HLRs creates routing challenges when a mobile station has a single Mobile Directory Number (MDN). The MDN is used to route a location request to the HLR associated with a particular mobile station. Standard routing procedures only allow the request to be routed to a single destination, i.e., either the existing HLR or the packet data HLR. However, the existing HLR is typically a different application than the packet data HLR and is unable to service location requests from the packet data network. Similarly, the HLR for packet data services is typically unable to service location requests from the existing cellular network. As a result, there is a need for a method and network for routing messages in a network integrating multiple communication services.

SUMMARY OF THE INVENTION

The invention relates to a method for routing messages in a telecommunications network. The method includes receiving a Signaling Connection Control Part (SCCP) message and determining the type of upper layer protocol employed in the SCCP message. The method also includes processing the SCCP message in response to the determined type of upper layer protocol. In one embodiment, the message is routed in response to the determined type of upper layer protocol.

Another embodiment of the method includes determining the type of upper layer protocol employed in the SCCP message in response to a determination that a global title address is not listed in a first routing table. The method further includes consulting a second routing table associated with the determined upper layer protocol type and searching the second routing table for the global title. The method further includes routing the message to a Home Location Register (HLR) associated with the determined upper layer protocol type in response to the global title being listed in the second routing table.

DETAILED DESCRIPTION OF THE PREFERRED EMBODIMENT

The invention relates to a method of routing a message in a telecommunications network. The method includes determining an upper layer protocol type employed in the message. Messages from different networks can employ different upper layer protocol types. For instance, messages from an American National Standard Institute (ANSI) 41 network employ the ANSI Transaction Capability Application Part (TCAP) upper layer protocol while messages from a GPRS network employ the International Telecommunication Union (ITU) TCAP protocol. As a result, the upper layer protocol type indicates the message type. Specifically, in a network receiving GPRS messages and ANSI-41 messages, the messages employing ANSI upper layer protocol are ANSI-41 messages while the messages employing ITU upper layer protocol are GPRS messages.

The method also includes routing the messages in response to the determined upper layer protocol type. For instance, in a network employing an ANSI-41 Home Location Register (HLR) and a GPRS HLR, messages employing the ANSI TCAP protocol are routed to the ANSI-41 HLR while messages employing the ITU TCAP protocol are routed to the GPRS HLR. As a result, routing the messages to the correct HLR is not dependent on a mobile station having multiple MDN numbers.

Figure 1:
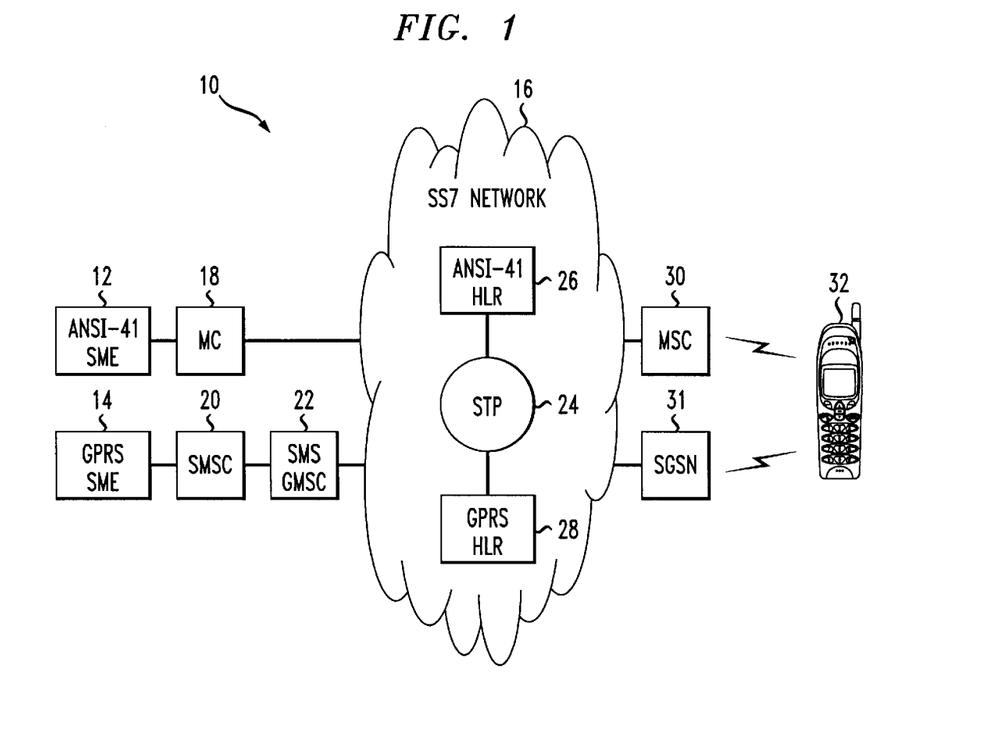
FIG. 1 illustrates a network for providing GPRS and TIA/EIA 136/ANSI-41 services to a mobile station.

FIG. 1 is a block diagram illustrating a network 10 which integrates a General Packet Radio Service (GPRS)-based short message service with an TIA/EIA 136/ANSI-41 network. The TIA/EIA 136/ANSI-41 network employs an TIA/EIA 136 air interface and a mobile station and an ANSI-41 network node interface. An ANSI-41 network node interface is a network protocol that operates between mobile switching centers, various databases used for mobility management and messaging centers. A TIA/EIA 136 air interface is a digital cellular interface standard that operates between base stations and mobile stations. The TIA/EIA 136 interface supports functions such as mobile registration, paging to deliver calls, call origination, handoff, telephony services and exchanges messages as part of a message service.

The network 10 includes an ANSI-41 Short Message Entity (ANSI-41 SME 12) and a General Packet Radio Service (GPRS) SME 14. The ANSI-41 SME 12 is an entity that can receive or send short ANSI-41-based messages. Similarly, the GPRS SME 14 is an entity that can receive or send GPRS-based short messages. Each SME can be located in the Common Channel Signaling System 7 (SS7) network 16, a mobile station, a service center, etc.

The network 10 includes a Messaging Center (MC 18) for storing and relaying of ANSI-41-based short messages. The network 10 also includes a Short Message Service Center (SMSC 20) and a Short Message Service Gateway Mobile Switching Center (SMS-GMSC 22) for storing and relaying GPRS-based messages.

The network 10 also includes a Signal Transfer Point (STP 24) in communication with an ANSI-41-based Home Location Register (ANSI-41 HLR 26), a General Packet Radio Service based HLR (GPRS HLR 28), a Mobile Switching Center (MSC 30) and a Serving GPRS Support Node (SGSN 31). The ANSI-41 HLR 26 provides HLR services for ANSI-41-based messages and the GPRS HLR 28 provides HLR services for GPRS-based messages. The ANSI-41 HLR and the GPRS HLR can be co-located or can be different entities that are remote from one another.

During operation of the network 10, the HLRs each retain a pointer to the current location of the mobile station 32 as the mobile station roams from one service area to another. In order for a message from either SME to be routed to the mobile station, the HLR associated with the message type, i.e. ANSI-41 or GPRS, is queried as to the current location of the mobile station. For instance, if the STP 24 receives an ANSI-41-based short message service request from the MC 18, the STP 24 routes this query to the ANSI-41 HLR 26. Similarly, if the STP 24 receives a GPRS-based short message service request from the SMS-GMSC, the STP 24 routes this query to the GPRS HLR 28. As a result, the network 10 makes routing decisions based on the message type.

A location request includes a request for the STP to perform Global Title Translation (GTT). GTT is a procedure by which the destination of the location request is determined from digits included in the location request. These digits are called the global title address. Suitable global title addresses for a mobile station include, but are not limited to, the mobile station's International Mobile Subscriber Identity (IMSI) number, Mobile Identification Number (MIN) and MDN. Since the STP performs the GTT, the originating signal points are relieved from the burden of maintaining databases of destination point codes.

In order to fulfill GTT requests, the STP is enhanced to consider multiple routing tables. These routing tables associate a global title address with a routing destination. The STP is also enhanced to include logic that causes the destination associated with a global title address to be changed in response to different criteria. The routing tables can be associated with a particular message type. For instance, the STP can include a GPRS routing table and an ANSI-41 routing table in addition to a standard routing table.

During operation of the network, the STP receives messages requesting GTT and consults the general routing table to determine whether the global title is present in the general table. If the global title is present, the message is routed as indicated in the general routing table. If the global title is not present, the message type is determined and the routing table associated with the determined message type consulted. The message is then routed to the destination shown in that routing table. If the global title is not present, standard error procedures are employed.

Figure 2:
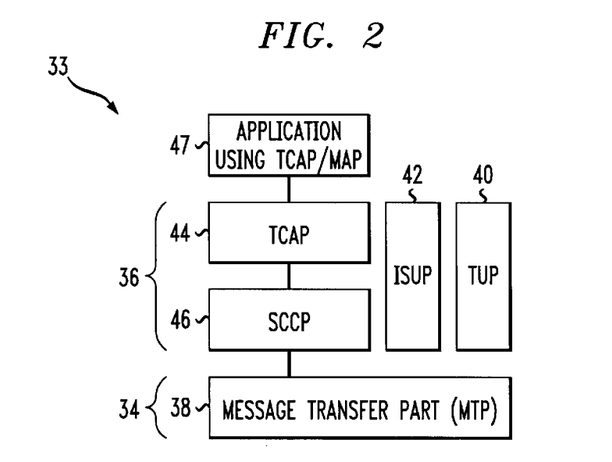
FIG. 2 is a block diagram of layers in an SS7 network.

The network 10 determines the message type based upon the type of upper layer protocol type employed in the message. The layers of a typical SS7 network protocol 33 are illustrated in FIG. 2. The illustrated layers map loosely to the Open Network Interconnect (OSI) model defined by the International Standards Organization (ISO). The illustrated SS7 network protocol 33 is divided into lower layers 34 and upper layers 36. The lower layers 34 include the Message Transfer Part (MTP 38) that is used to physically transport data from one point to another in the network. The upper layers 36 include a Telephone User Part (TUP 40) for basic telephone service, and an Integrated Service Digital Network (ISDN) User Part (ISUP 42) for combined voice and data services.

The upper layers 36 also include the Transaction Capabilities Application Part (TCAP 44) and the Signaling Connection Control Part (SCCP 46). The purpose of the SCCP 46 is to provide the means for end-to-end message routing. This routing includes not only routing to the nodes themselves but also routing to individual applications within a node. Accordingly, the SCCP processes the specified address within a particular message to properly deliver data to the specified destination. The MTP 38 uses this information at each node to determine which communication link to use for routing.

The SCCP 46 also provides the ability to perform Global Title Translation (GTT). As described above, GTT is the process where the destination for a message is determined from digits present in the message. A suitable example of these digits is the Mobile Identification Number (MIN) associated with a mobile station.

The TCAP 44 provides application-layer protocols that allow an application 47 at one node to invoke execution of a procedure at another node and exchange the results of such an invocation. These applications 47 employ the TCAP 44 and the SCCP 46 to transport application layer data from one application to another via the MTP 38. Applications 47 can further employ their own message signals to interface directly with the SCCP 46 in order to communicate application layer data from one application to another application. An example of such a signal is the communication of a Mobile Application Part (MAP)-based location request from an MSC 30 to an HLR.

Message type can be determined by examining the upper layer protocol type employed in the message. For instance, ANSI-41-based messages employ a different type of TCAP than do GPRS-based messages. Specifically, ANSI-41-based messages employ American National Standards Institute (ANSI) TCAP while GPRS messages employ International Telecommunication Union (ITU) TCAP. Hence, the TCAP type indicates the message type. Specifically, in the context of a wireless network, if a message includes ITU TCAP, the message is a GPRS-based message; and if a message includes ANSI TCAP, the message is an ANSI-41 message.

Figure 3:
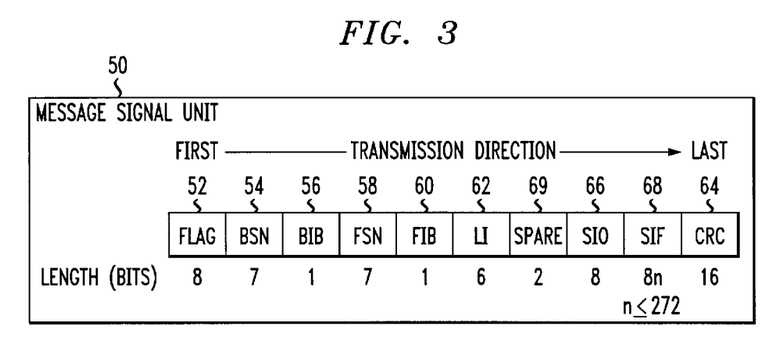
FIG. 3 is a block diagram of a message signal unit used in an SS7 network.

The TCAP type can be identified by examining a message signal unit (MSU 50). FIG. 3 illustrates an MSU 50 used in a typical SS7 network 16. The MSU 50 is constructed from ten parts. The 8-bit flag 52 indicates the beginning of a new MSU 40 and implies the end of the previous signal unit. The Backward Sequence Number (BSN 54), the Backward Indicator Bit (BIB 56), the Forward Sequence Number (FSN 58), the Forward Indicator Bit (FIB 60), the length indicator (LI 62) and the Cycle Redundancy Check (CRC 64) are used for error identification and recovery. The Service Information Octet (SIO 66) and the Signaling Information Field (SIF 68) include the message routing information and the message contents. The spare 69 includes two spare bits.

Figure 4:
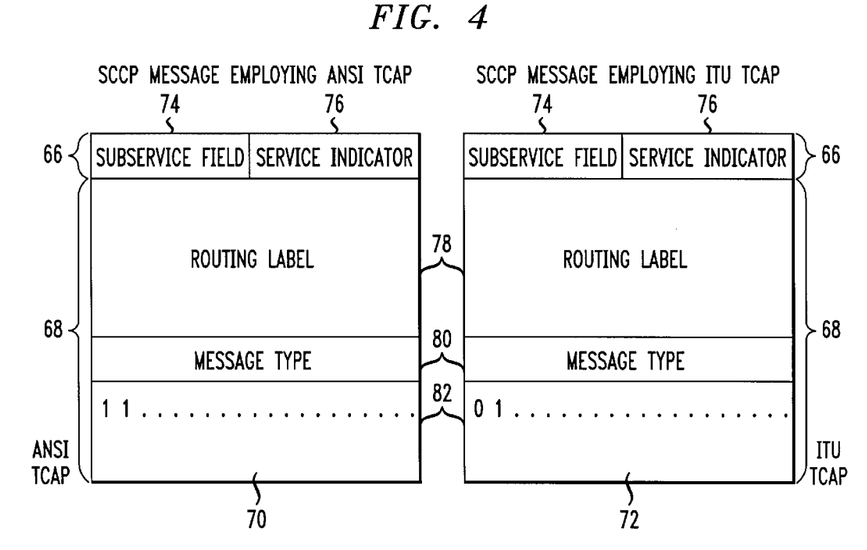
FIG. 4 is a block diagram of Service Information Octet (SIO) and the Signaling Information Field (SIF) of a message signaling unit (MSU).

FIG. 4 illustrates the SIO 66 and the SIF 68 of an SCCP message employing ANSI TCAP 70 and an SCCP message employing ITU TCAP 72. The 8-bit SIO 66 contains a 4-bit subservice field 74 followed by a 4-bit service indicator field 76. The subservice field 74 contains a network indicator and a message priority indicator. The service indicator field 74 indicates the user of the MTP 38. For instance, the service indicator field 74 indicates whether the MTP 38 is being used by the TUP, ISUP, SCCP, etc. The SIF 68 contains a routing label field 78, a message type field 80 and a message contents field 82.

The TCAP is included in the message contents field of the SCCP message. The first two bits of the TCAP indicate the TCAP protocol type and accordingly the message type. As shown in FIG. 4, the first two bits of the TCAP in the SCCP message employing ANSI TCAP 70 are a "11" while the first two bits of the TCAP in the SCCP message employing ITU TCAP are a "01". These values are used for an ANSI-41- and GPRS MAP-based messages including invokes, return results, return error and return rejection. As a result, the TCAP type can be determined by examining the first two bits of the message contents field. Further, since GPRS-based SCCP messages employ ITU TCAP and ANSI-41-based SCCP messages employ ANSI TCAP, identifying the TCAP type indicates the message type. Specifically, in the network 10 illustrated in FIG. 1, an SCCP message employing ITU TCAP 72 is a GPRS message while an SCCP message employing ANSI TCAP 70 is an ANSI-41 message. Hence, an ITU TCAP-based SCCP message requesting global title translation is routed to the GPRS HLR 28 while an ANSI TCAP-based SCCP message requesting global title translation is routed to the ANSI-41 HLR 26.

Figure 5:
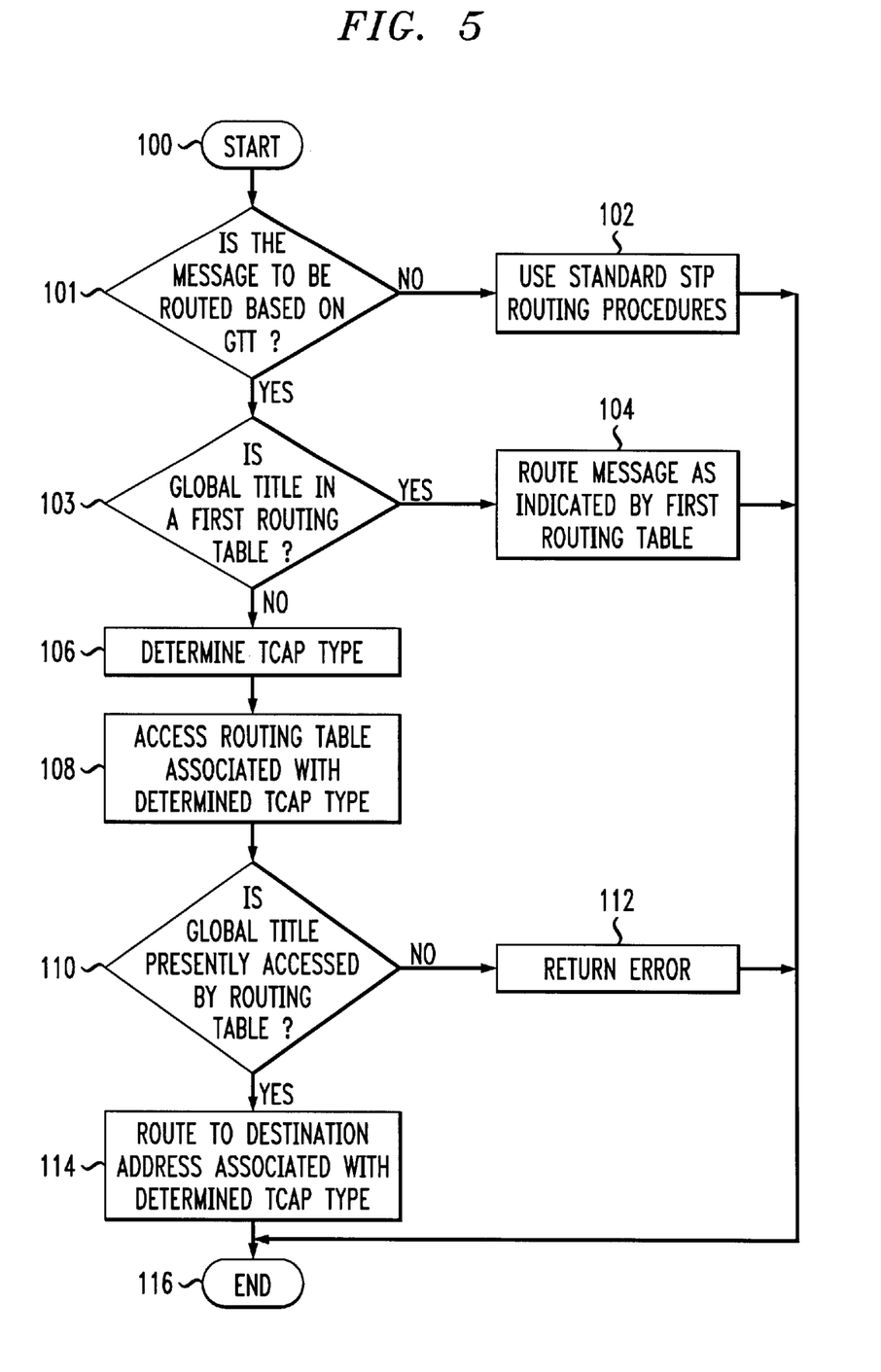
FIG. 5 is a process flow of a method for routing messages in a telecommunications network.

FIG. 5 is a process flow of a method for routing messages in a telecommunications network 10. The method begins at start block 100 when a message is received. At determination block 101, a determination is made whether the message is to be routed based on global title translation. When the determination is negative, the STP routes the message using standard STP routing procedures at process block 102. When the determination is positive, the STP 24 proceeds to determination block 103. At determination block 103, a determination is made whether the global title in the global title translation request message is present in a standard GTT table. When the global title is found in the standard routing table, the message is routed to the destination indicated in the standard routing table at process block 104.

When the global title is not found in the first routing table, the TCAP type is determined at process block 106. At process block 108, a routing table associated with the determined TCAP type is consulted. For instance, if the TCAP is determined to be an ITU TCAP, a GPRS routing table is consulted; and if the TCAP is determined to be an ANSI TCAP, an ANSI-41 routing table is consulted. At decision block 110, a determination is made whether the global title in the message is present in the consulted table. If the determination is negative, standard GTT procedures will be used at process block 112. For instance, the STP 24 can respond with a return on error or discard on error depending on the message contents. If the determination is positive, the message is routed to a destination address associated with the message type at process block 114. Suitable destination addresses include HLR addresses. As a result, if the message is a GPRS message, the message is routed to the GPRS HLR 28. After routing of the message at process block 102, process block 104 and process block 114, the message processing ends at end block 116. Similarly, the message processing ends at end block 116 after returning an error at process block 112.

For the method described above, the routing tables are associated with the translation type which is requested by the message. For instance, Title Translation type 14 (TT 14) is a type of title translation based on the destination subscriber's directory number. As a result, TT 14 is the type of title translation that is appropriate for routing short messages to a mobile station. Accordingly, when translation type 14 is requested, the routing tables employed for routing of the message are specific to translation type 14.

Although the above method is described as being performed by an STP 24, the method can also be performed by any network entity having message routing responsibilities. For instance, the method can be performed by an MSC, an MC, an SMSC 20. Another example of a network entity that can practice the method according to the present invention is a gateway such as a gateway between networks or an international gateway. For instance, an international gateway might receive ANSI-41 messages, GPRS messages and Global System for Mobile (GSM) communications messages. The GSM messages employ ITU TCAP while the ANSI-41 messages employ the ANSI TCAP. The gateway can determine the TCAP type to distinguish between ANSI-41 messages and non-ANSI-41 messages (GPRS, GSM) and route these messages to the associated HLR.

Further, additional message processing can be performed in response to the TCAP message type. For instance, a particular global title translation type can be assigned to the message in response to the TCAP type employed in the message. If an international gateway receives a message having an IMSI global title and employing ANSI TCAP, the gateway would assign the message to IMSI to ANSI-41 HLR translation type. However, if the message employed ITU TCAP, the gateway would assign the message to IMSI to GPRS/GSM HLR translation type. The IMSI to ANSI-41 HLR translation type indicates that the message is destined for an ANSI HLR and employs an IMSI global title. Similarly, the IMSI to GPRS/GSM HLR translation type indicates that the message is destined for a GPRS/GSM HLR and employs an IMSI global title. Once the gateway determines the translation type, the gateway populates a "translation type" field in the called party address of a message with the determined translation type. Although a gateway is used to describe message processing which can be performed in response to the determined TCAP type, other network components can also perform this processing.

Figure 6:
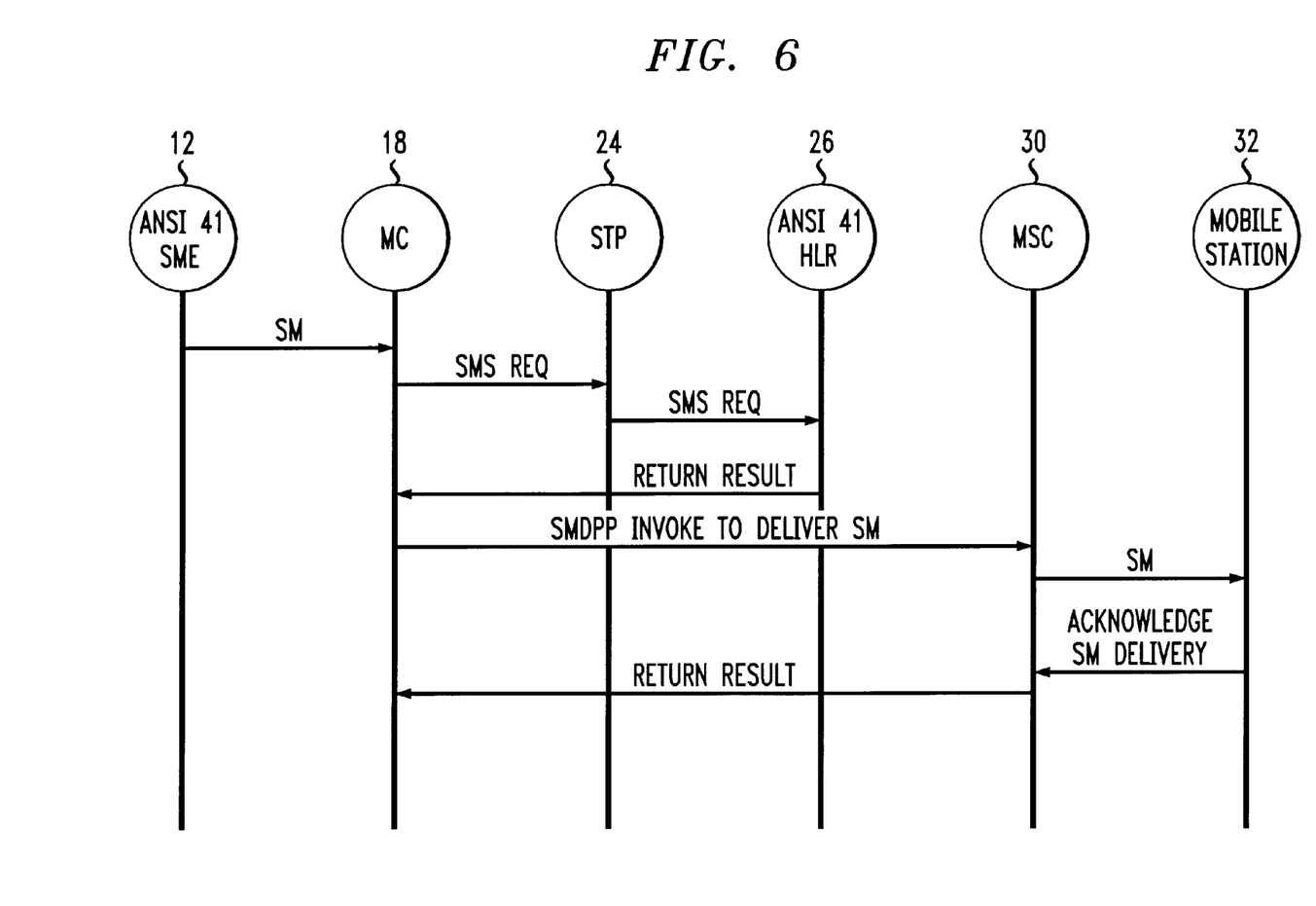
FIG. 6 is a message sequence diagram illustrating a short message being forwarded from an ANSI-41-based message center to a mobile station.

FIG. 6 is a message sequence diagram illustrating a short message being forwarded from the ANSI-41 SME 12 illustrated in FIG. 1 to the mobile station. The ANSI-41 SME 12 submits the short message to the MC 18. The MC 18 sends a GTT request message to the STP 24 using the SMSREQ operation. This request includes the MDN of the mobile station. The STP 24 employs the method illustrated in FIG. 4 to discern that the request employs ANSI TCAP. Accordingly, the STP 24 forwards the message to the ANSI-41 HLR 26. The ANSI-41 HLR 26 sends a return result to the MC with the serving MSC's address information. The MC 18 employs this address information to send an SMDPP invoke to the serving MSC 30 to deliver the message to the serving MSC 30. The serving MSC 30 forwards the message to the mobile station 32 which acknowledges delivery of the message. The MSC 30 then sends a return result to the MC 18.

Figure 7:
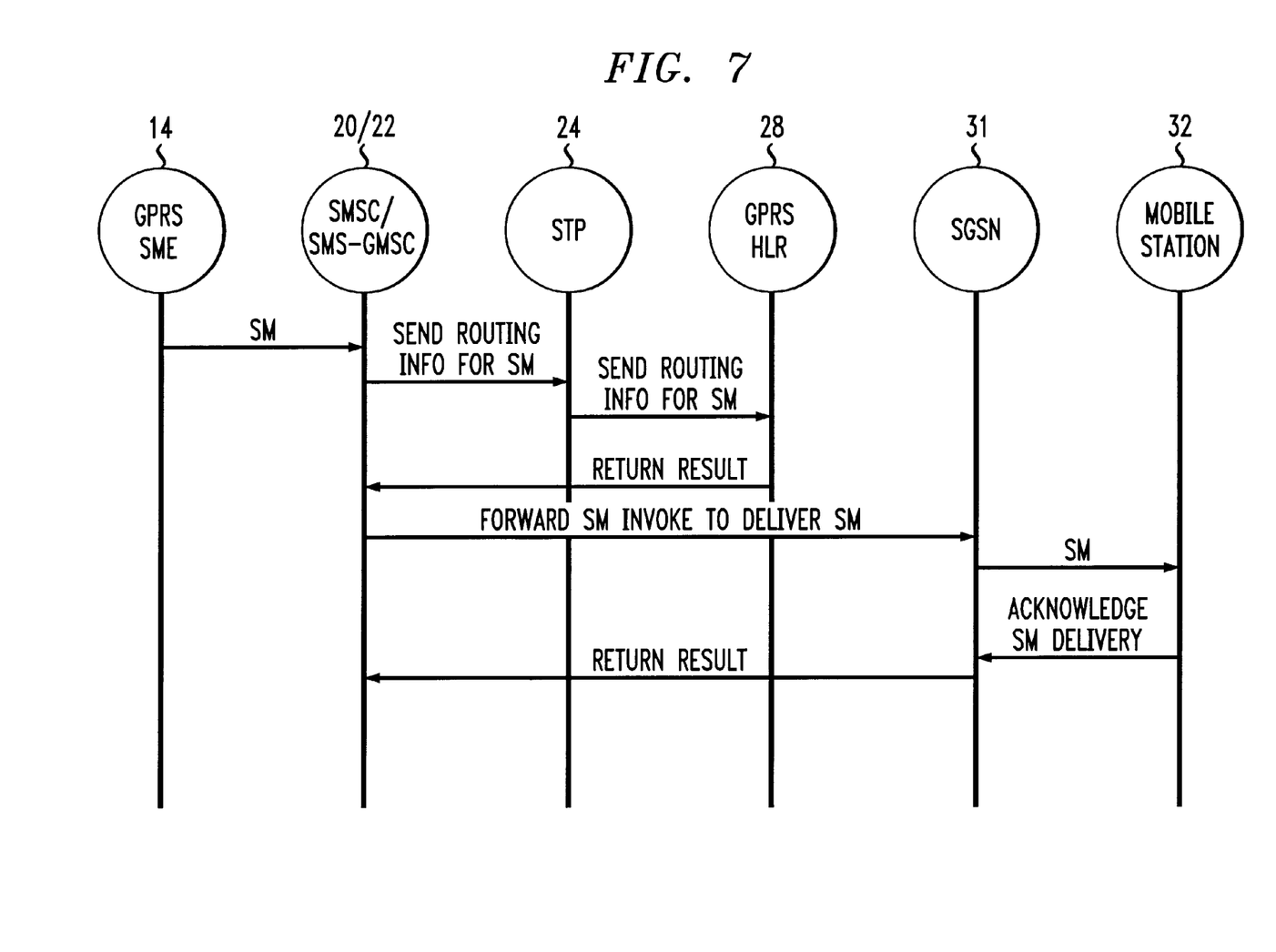
FIG. 7 is a message sequence diagram illustrating a short message being forwarded from a GPRS-based Short Message Service Center to a mobile station.

FIG. 7 is a message sequence diagram illustrating a short message being forwarded from the GPRS SME 14 illustrated in FIG. 1 to the mobile station. The GPRS SME 14 submits the short message to the SMSC 20/SMS-GMSC 22. The SMSC 20/SMS-GMSC 22 sends a GTT request message to the STP 24 using the SEND-ROUTING-INFO-FOR-SM operation. This request includes the MDN of the mobile station. The STP 24 employs the method illustrated in FIG. 4 to discern that the request employs ITU TCAP. Accordingly, the STP 24 forwards the message to the GPRS HLR 28. The GPRS HLR 28 sends a return result to the SMSC 20/SMS-GMSC 22 with the serving SGSN's address information. The SMSC 20/SMS-GMSC 22 employs this address information to send a FORWARD SM invoke to the serving SGSN. The SGSN 31 forwards the message to the mobile station 32 which acknowledges delivery of the message. The SGSN 31 then sends a return result to the SMSC 20/SMS-GMSC 22.

Although the above invention is described in the context of a network that incorporates GPRS into an ANSI-41/TIA/EIA 136 network, other telecommunications networks, networks and services can employ the invention.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A method for routing messages in a telecommunications network, comprising:

receiving a Signaling Connection Control Part (SCCP) message;

determining a type of upper layer protocol employed in the SCCP message; and routing the SCCP message in response to the determined type of upper layer protocol.

2. The method of claim 1, wherein determining the type of upper layer protocol includes examining the Transaction Capabilities Application Part (TCAP) of the SCCP message.

3. The method of claim 1, wherein determining the type of upper layer protocol includes determining the type of Transaction Capabilities Application Part (TCAP) employed in the SCCP message.

4. The method of claim 3, wherein determining the type of TCAP includes determining a bit pattern in the TCAP of the SCCP message.

5. The method of claim 4, wherein determining a bit pattern in the TCAP of the SCCP message includes examining the first two bits in the TCAP.

6. The method of claim 1, wherein the type of upper layer protocol is selected from the group consisting of American Standard National Standards Institute (ANSI) and International Telecommunication Union-Telecommunication (ITU).

7. The method of claim 1, wherein routing the message includes routing the message to a destination associated with the determined upper layer protocol type.

8. The method of claim 7, wherein the message is routed to an American National Standards Institute (ANSI) Home Location Register (HLR) in response to the message employing an ANSI based Transaction Capabilities Application Part (TCAP) and being routed to an General Packet Radio Service (GPRS) HLR in response to the message employing International Telecommunication Union (ITU) TCAP.

9. The method of claim 1, further comprising:

comparing a global title present in the message with a general routing table before determining a type of upper layer protocol.

10. The method of claim 9, wherein determining a type of upper layer protocol is performed in response to not finding the global title in the general routing table.

11. The method of claim 1, wherein a global title in the message is compared to a routing table associated with the determined upper layer protocol type.

12. The method of claim 11, wherein the message is routed to a destination address associated with the determined upper layer protocol type in response to finding the global title in the routing table.

13. The method of claim 1, wherein receiving the SCCP message includes receiving the SCCP message at a Signaling Transfer Point (STP).

14. The method of claim 1, wherein receiving the SCCP message includes receiving the SCCP message at a gateway.

15. A method for routing a message in a network, comprising:

receiving a Signaling Connection Control Part (SCCP) message;

determining a type of upper layer protocol employed in the SCCP message in response to a determination that a global title address is not listed within a first routing table;

consulting a second routing table associated with the determined upper layer type; and searching the second routing table for the global title address.

16. The method of claim 15, wherein the message is routed to a destination address associated with the determined upper layer protocol type in response to finding the global title in the second routing table.

17. A method for routing messages in a telecommunications network, comprising:

receiving a Signaling Connection Control Part (SCCP) message;

determining a type of upper layer protocol employed in the SCCP message; and processing the SCCP message in response to the determined type of upper layer protocol.

18. The method of claim 17, wherein determining the type of upper layer protocol includes determining the type of Transaction Capabilities Application Part (TCAP) employed in the SCCP message.

19. The method of claim 17, wherein processing the SCCP message in response to the determined type of upper layer protocol includes assigning the SCCP message to a particular global title translation type associated with the determined upper layer protocol type.

20. The method of claim 17, wherein processing the SCCP message in response to the determined type of upper layer protocol includes assigning the SCCP message to a particular global title translation type associated with the determined upper layer protocol type and a type of global title employed in the SCCP message.

21. The method of claim 19, wherein assigning the message to a particular global title translation type includes placing the assigned global title translation type in a translation type field of a called party address.

* * * * *

UNITED STATES PATENT AND TRADEMARK OFFICE
CERTIFICATE OF CORRECTION

PATENT NO. : 6,577,723 B1
DATED : June 10, 2003
INVENTOR(S) : Mooney

It is certified that error appears in the above-identified patent and that said Letters Patent is hereby corrected as shown below:

<u>Title page,</u>
Item [73], Assignee, "AT&T Wireless Service, Inc." to
-- AT&T Wireless Services, Inc. --.

Signed and Sealed this

Sixteenth Day of September, 2003

JAMES E. ROGAN
*Director of the United States Patent and Trademark Office*